(No Model.)  
2 Sheets—Sheet 1.

G. R. PEARE.  
WAX HEATING DEVICE FOR SEWING MACHINES.

No. 405,592.  
Patented June 18, 1889.

Witnesses:  
Edgar A. Goddin  
Fred. S. Greenbaum

Inventor  
George R. Peare  
by Crosby Gregory  
attys.

(No Model.) 2 Sheets—Sheet 2.
G. R. PEARE.
WAX HEATING DEVICE FOR SEWING MACHINES.
No. 405,592. Patented June 18, 1889.
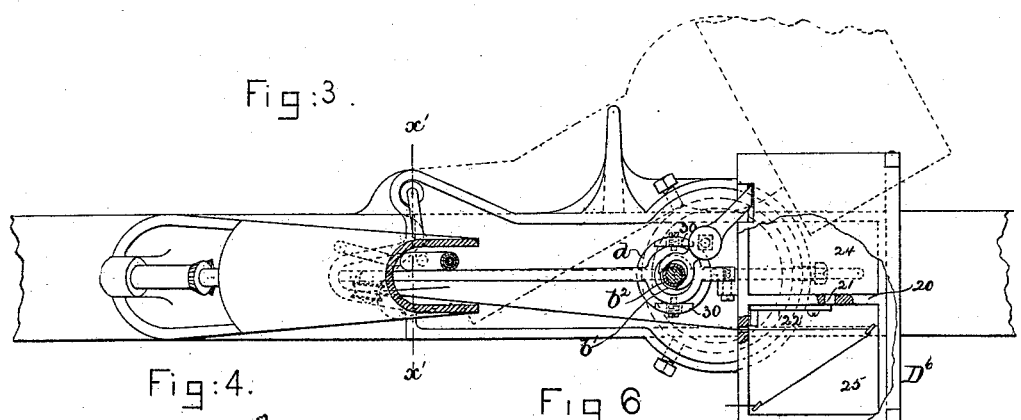
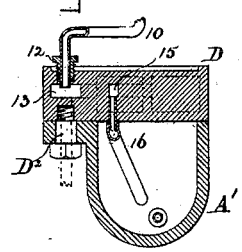
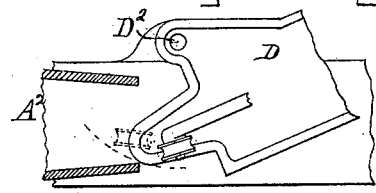
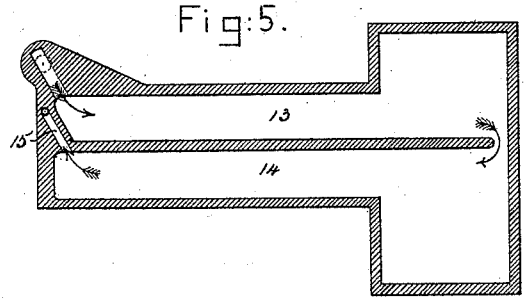
Witnesses:
Edgar A. Goddin
Fred. S. Greenleaf
Inventor.
George R. Peare.
By Crosby & Gregory
attys

UNITED STATES PATENT OFFICE.

GEORGE R. PEARE, OF LYNN, ASSIGNOR OF ONE-HALF TO EDWIN L. SPRAGUE, OF BOSTON, MASSACHUSETTS.

WAX-HEATING DEVICE FOR SEWING-MACHINES.

SPECIFICATION forming part of Letters Patent No. 405,592, dated June 18, 1889.

Application filed April 24, 1888. Serial No. 271,667. (No model.)

*To all whom it may concern:*

Be it known that I, GEORGE R. PEARE, of Lynn, county of Essex, State of Massachusetts, have invented an Improvement in Sewing-Machines, of which the following description, in connection with the accompanying drawings, is a specification, like letters on the drawings representing like parts.

This invention has for its object to improve that class of sewing-machines using a horn, my improvements comprehending means for heating the horn, for waxing the thread, and structural changes in the horn.

In this my present invention the waxing and tension devices are pivoted or made movable on the horn, so as to uncover the gearing without necessitating dismembering the horn, and to facilitate threading. The plate on which rests the waxing-vessel is chambered for the circulation on it of steam, and the horn and the said vessel are in steam communication with a steam-joint surrounding the shaft forming the axis of rotation of the horn, the said joint being of peculiar construction, as will be described.

My invention consists, essentially, in the combination, with the rotating horn of a sewing-machine and a steam-joint surrounding the shank of the said horn, of a wax-chamber and pipes or passages to lead steam from the said steam-joint to the horn, and thence to the said wax-chamber to melt the wax therein, and return pipes or passages leading therefrom, substantially as will be described; also in a rotating horn, combined with a wax-chamber and a hollow base, carrying the same and pivoted to the horn, eccentric to the center of rotation thereof, to be turned aside, substantially as will be described; also in a horn, a hollow ported base pivoted thereon, a wax-chamber, and a take-up lever pivoted on the said base, and having a sheave extended into the space in the said horn, whereby by turning the said base the said sheave may be moved out from and into the said horn, substantially as will be described.

Other features of my invention will be pointed out in the claims at the end of this specification.

Figure 1:
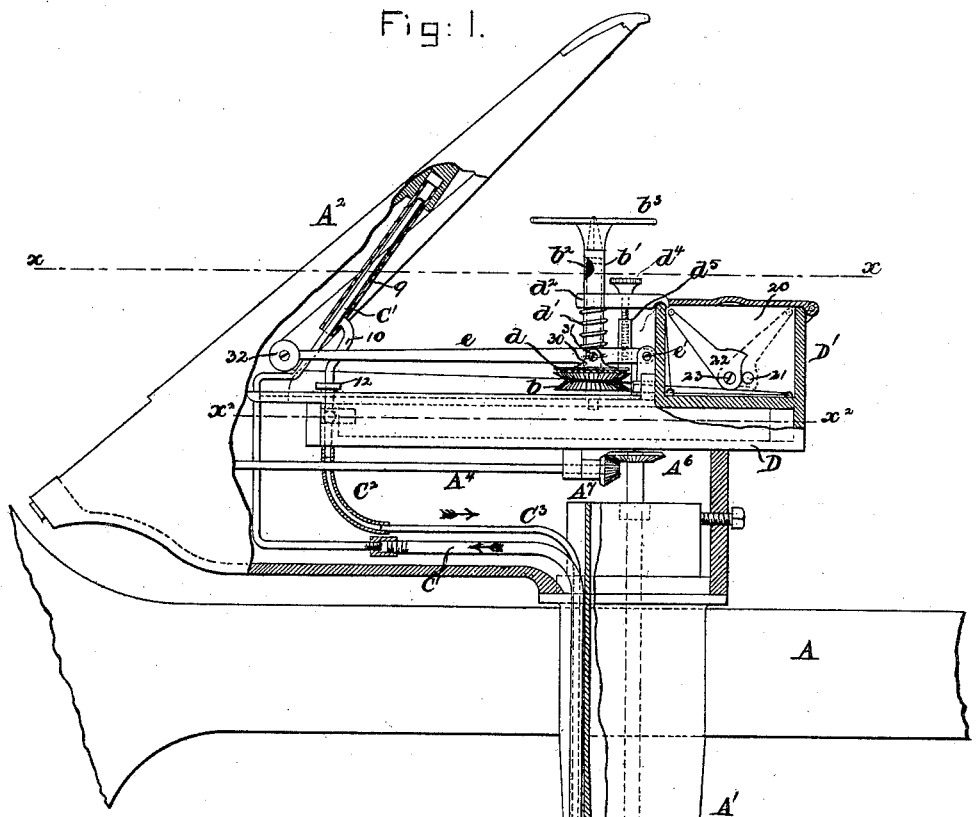
Figure 2:
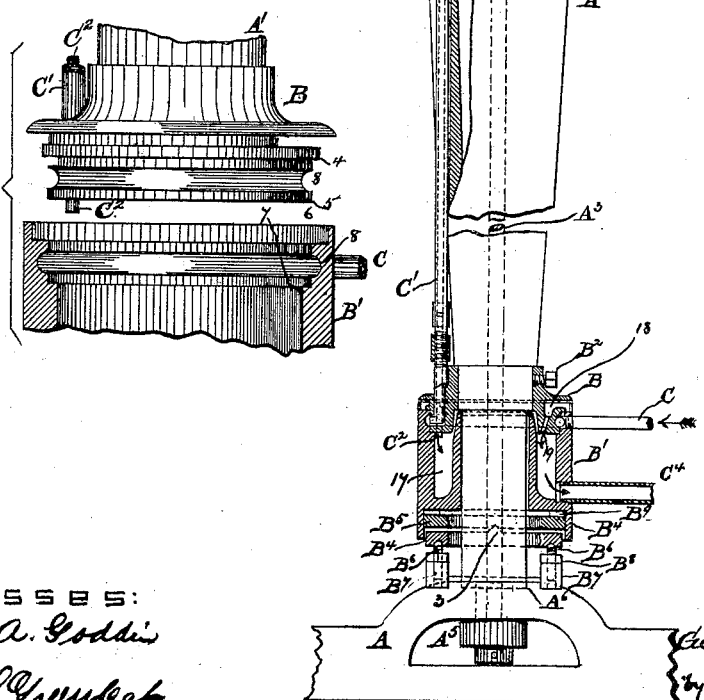

Figure 1 is a partial elevation and section of a sufficient part of a horn to enable my invention to be understood; Fig. 2, an enlarged detail of the steam-joint. Fig. 3 is a section of the horn shown in Fig. 1 below the dotted line $x$. Fig. 4 is a section of Fig. 3 on the dotted line $x'$. Fig. 5 is a partial section of Fig. 1 on the dotted line $x^2$, and Fig. 6 is a detail showing part of the horn and hollow or ported base turned aside to expose the sheave at the end of the take-up lever.

The frame-work A, the shank A', which constitutes the axis of rotation for the horn $A^2$, the vertical spindle $A^3$, the horizontal shaft $A^4$, and the gears $A^5$ $A^6$ $A^7$, are and may be all as common to the so-called "McKay sole-sewing machine," so need not be herein further described.

The shank A' is herein shown as surrounded near its lower end by a steam-joint, which, as herein shown, is composed of two parts B B', the part B being fixed to the shank A' by a screw $B^2$, while the part B' surrounds loosely the said shank, the part B' taking a seat upon an adjustable step composed, as herein shown, of two rings $B^4$ $B^5$, the ring $B^4$ being mounted at the upper ends of two like adjusting-screws $B^6$, screwed into bosses $B^7$, rising from the frame-work, each screw having a set-nut $B^8$.

The ring $B^5$ at points ninety degrees from the screws $B^6$ is provided with suitable notches (see Fig. 1, dotted lines) to receive suitable projections or lugs 3 at the upper side of the ring $B^4$, so that the ring $B^5$ may tip on the ring $B^4$, both acting as customary in so-called "binnacle-rings." Between the ring $B^5$ and the part B' of the joint I have placed a flexible washer $B^9$. The chief weight of the horn is taken preferably by a shoulder at the lower end of the shank A', it resting on a step, as $A^6$, as shown in Fig. 1; but by the screws $B^6$ the part B' may be adjusted vertically to co-operate with the part B and thereby bear more or less of the weight of the horn. The part B', held as described, is free to tip to a limited extent, as the part B in its rotation requires, for it will be understood that that portion of the part B which enters the part B' should be steam-tight. As shown, the part B has two annular shoulders 4 5, which take seats on the shoulders 6 7 of the part B', the portion of the part B between the shoulders 4 and 5 or of the part B' between the shoulders 6 and 7 being grooved annularly (see Fig. 2) to form a steam-channel 8 in communication with the steam-inlet C, the steam following the said channel 8 and entering the mouth of a pipe C', (see Fig. 2,) led up through the part B and let into a vertical groove made at the outside of the shank A', the steam-pipe C' being bent to follow along the base of the horn and up into the horn, the upper end of the said pipe within the inclined part of the horn $A^2$ entering loosely but telescopically a return-pipe 9 screwed at its upper end into the metal of the horn, the lower end of the said return-pipe being closed steam-tight around the pipe C'. The return-pipe near its lower end has joined to it an elbow-like branch 10, the lower end of which (see Fig. 4) is entered loosely into a stuffing-box 12 formed in the base D of the waxing appliance in line with the center $D^2$, on which the said base is pivoted to turn when it is desired to swing aside from the base of the horn the waxing and tension devices to gain access to the horn-gearing or to manipulate the thread with relation to the tension mechanism.

The base D (see Fig. 5) is separated by a division-wall $a$ to form two channels 13 14 for the steam, as herein shown, it having heated the horn entering the channel 13, passing around the end of the partition below the bottom of the wax-chamber D', and thence along the channel 14 to its opposite end, where the steam enters a port 15, so as to pass again to the same side of the base D at which it entered, the small pipe 16 (see Fig. 4) in continuation of the port 15 entering the flexible section $C^2$ of the return-pipe, and thence into the portion $C^3$ of the return-pipe, which latter in a groove in the shank A' passes through the part B and terminates in the chamber 17 (see Fig. 1) in the part B', the said chamber having in connection with it a drip-pipe $C^4$.

To prevent any water of condensation due to leakage between the parts B and B' from escaping and running over and down the part B', I have extended the part B' above the shoulders 4 6, and have provided the part B above the shoulder 4 with a channel 18, in communication with which is a hole 19, which permits said water of condensation to enter the chamber 17.

The parts B and B' are so made and put together as to form a balanced joint; or the joint is so made that the pressure of the steam has no tendency to separate or lift the part B from the part B', as would be the case if the part B' contained a steam-chamber into which entered the part B, the steam acting directly upon the lower side of the said part B, thus exerting a pressure in a direction to separate the two parts. It will be seen that the part B is free to rotate with the horn-shank in the part B'.

The base D has connected to or forming parts of it a waxing-chamber D', divided by a partition 20, having in it a hole 21, (see Figs. 1 and 3,) which has co-operating with it a valve 22, shown as a lever pivoted at 23 on the said partition.

The wax to be melted is first put into the half 24 of the waxing-chamber, and is let into the half 25 through the hole 21 as needed, the half 25 of the said chamber having suitable guide-eyes for the thread, it being taken from a spool or cop in usual manner. As the thread leaves the waxing-chamber, it is passed around a tension-pulley $b$, forming part of a sleeve $b'$, fitted loosely over a stud $b^2$, erected on the base D, the said sleeve at its upper end having fixed to it a hand-wheel $b^3$, by which to turn the tension-wheel $b$ when the operator is about to start the machine to sew. The sleeve $b'$ is extended through a pressure or friction plate $d$, having at its upper side ears 30, which are connected by pivot-screws 31 to a take-up lever $e$, pivoted at $e'$. The plate $d$ receives upon it the lower end of a spiral spring $d'$, the upper end of which, surrounding the sleeve $b'$, abuts against a stop $d^2$, which is made adjustable by a screw $b^4$, screwed into the upper end of a boss $d^5$, rising from the base D. The spring $d'$ acts normally to press the friction-plate $d$ against the tension-wheel $b$. The thread from the tension-wheel $b$ is led partially about the sheave 32 of the take-up lever $e$, and thence up to the device which is to present the thread to the usual hooked needle.

The operator, by the screw $d^4$, will put upon the tension-wheel $b$, through the spring and the friction or pressure plate, an amount of tension in excess of that required for sewing; but at the same time the spring will put upon the take-up lever a strain substantially what it is desired that the thread shall be subjected to; but as the thread is drawn upon by the needle the take-up is lifted against the spring $d'$ whenever the strain on the thread is in excess of that desired that it shall bear, and the friction-plate is at such time made to relax for an instant a portion of its frictional hold on the tension-wheel $b$.

If desired, the base D may be made hollow, as shown, and receive in it one end of the steam or fluid pipe C', and in such case the inclined part of the horn would not be heated.

I claim—

1. The rotating horn of a sewing-machine, and a steam-joint surrounding the shank of the said horn, combined with a wax-chamber, and pipes or passages to lead steam from the said steam-joint to the horn, and thence to the said wax-chamber to melt the wax therein, and with return pipes or passages leading therefrom, substantially as described.

2. The horn and the steam-joint consisting of the loosely-supported part B', having internal shoulders 6 and 7, and the part B, rigidly attached to the horn-shank and having shoulders 4 and 5, which are seated on internal shoulders, the said parts having an annular steam-channel 8 between said shoulders, as described, combined with pipes to conduct steam from the said channel into the upper portion of the horn and to return the same more or less condensed into the part B' below said steam-channel, substantially as described.

3. The horn-shank, its rigidly-attached part B, and the tipping part B', surrounding the horn-shank loosely, and having the chamber 17 for reception of water of condensation, the part B being fitted into the said part B' to form a balanced joint, combined with a return-pipe extended through the part B into the said chamber in the part B', and an outlet therefor, substantially as described.

4. The horn, its shank provided externally with a groove, and the shank-bearing, combined with the part B of the steam-joint and with the direct and return pipes connecting said joint and horn, and extended through the bearing in the said groove, substantially as described.

5. The rotating horn, combined with the wax-chamber and the hollow base carrying the same, and pivoted to the horn eccentric to the center of rotation thereof, to be turned aside therefrom, substantially as described.

6. The horn, the hollow ported base D, pivoted thereon, the wax-chamber, and the take-up lever pivoted on the said base and having a sheave extended into the space in the said horn, whereby by turning the said base the said sheave may be moved out from and into the said horn, substantially as described.

7. The horn, the hollow ported base D, and the wax-chamber thereon provided with a partition having an opening, combined with a valve to open or close the said opening, substantially as described.

8. The horn and the steam-pipe to lead steam into the upper end of the horn, combined with the pipe portion 9, having its upper end inserted firmly into the metal of the horn, the steam-pipe being extended through the said pipe portion, which is closed at its lower end immediately about the steam-pipe, the pipe portion 9 being in communication with the portion forming part of the return-pipe, substantially as described.

9. The horn, its shank, and steam-pipes, combined with the steam-joint and binnacle-rings to support it, substantially as described.

10. The horn, its shank, and steam-pipes, combined with the steam-joint and binnacle-rings to support it, and elastic ring and adjusting-screws, substantially as described.

In testimony whereof I have signed my name to this specification in the presence of two subscribing witnesses.

GEO. R. PEARE.

Witnesses:
G. W. GREGORY,
B. DEWAR.